US012802074B2

(12) United States Patent
Satya Sivajee Pinnamaneni et al.

(10) Patent No.: US 12,802,074 B2
(45) Date of Patent: Nov. 17, 2026

(54) METHOD AND SYSTEM TO TACKLE TICKET RESALE FRAUD FOR HONEST AND SECURE TRANSACTIONS

(71) Applicant: Mastercard International Incorporated, Purchase, NY (US)

(72) Inventors: Venkata Satya Sivajee Pinnamaneni, Dardenne Prairie, MO (US); Kaushal Shetty, Thane (IN); Sachin Kumar Singh, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 37 days.

(21) Appl. No.: 18/909,272

(22) Filed: Oct. 8, 2024

(65) Prior Publication Data

US 2026/0099846 A1 Apr. 9, 2026

(51) Int. Cl.
*G06Q 20/40* (2012.01)
*G06Q 20/38* (2012.01)

(52) U.S. Cl.
CPC ..... *G06Q 20/4016* (2013.01); *G06Q 20/3827* (2013.01)

(58) Field of Classification Search
CPC ....................... G06Q 20/4016; G06Q 20/3827
USPC .......................................................... 235/375
See application file for complete search history.

(56) References Cited

U.S. PATENT DOCUMENTS 7,093,130 B1 * 8/2006 Kobayashi .............. H04L 63/12 713/168
10,719,786 B1 * 7/2020 Treseler ................. G06Q 50/01
11,151,838 B2 10/2021 Ragnoni et al.
11,861,622 B2 1/2024 Amir et al.
2003/0069810 A1 * 4/2003 Gathman ............... G06Q 10/02 705/26.1
2003/0069827 A1 * 4/2003 Gathman ............... G06Q 10/02 705/37
2003/0069829 A1 * 4/2003 Gathman ............... G06Q 40/04 705/37
2020/0034899 A1 1/2020 Castinado et al.
2020/0065899 A1 2/2020 Fritsch et al.
2020/0265343 A1 * 8/2020 Plant ....................... G06Q 10/02
2022/0374888 A1 11/2022 Lackey
2023/0325814 A1 * 10/2023 Vijayan .............. G06Q 20/3829 705/66

FOREIGN PATENT DOCUMENTS

WO 2024044222 A1 2/2024

* cited by examiner

*Primary Examiner* — Paultep Savusdiphol
(74) *Attorney, Agent, or Firm* — PANITCH SCHWARZE BELISARIO & NADEL LLP

(57) ABSTRACT

A method for secure ownership transfer of a digital token includes receiving a token request from a first computing device, the token request including at least first device data. The method further includes generating a digital token, storing the generated digital token and first device data, transmitting the generated digital token to the first computing device in response to the received token request, and receiving a transaction message for a payment transaction, wherein the transaction message includes at last one data element storing a token value. The method also includes validating the token value, and replacing the stored first device data with second device data after successful validation of the token value.

16 Claims, 7 Drawing Sheets

500

METHOD AND SYSTEM TO TACKLE TICKET RESALE FRAUD FOR HONEST AND SECURE TRANSACTIONS

FIELD

The present disclosure relates to the prevention of ticket resale fraud, specifically the use of secure digital tokens for tracking ticket ownership, transfer, and usage to prevent fraud in the resale of event tickets.

BACKGROUND

Thousands of events (e.g., sports events, concerts, entertainment shows, etc.) occur across the world every single day with many of these events having attendance limited to those who purchase a ticket for that event. For popular and exclusive events, tickets can sell out extremely quickly, leaving many people unable to attend the event. When demand is greater than supply for an event, there is a market for ticket resale where those with a ticket who are unable to attend can resell their ticket to an interested party to recoup the purchase costs. For more exclusive and in-demand events, resale tickets can often greatly exceed the initial purchase price of a ticket, resulting in people who purchase tickets solely for the purpose of resale.

As the demand for tickets increases for such popular and exclusive events, prices often go up. Unfortunately, the increase of prices for tickets often results in the increase of fraudulent tickets entering the resale market. Resale ticket fraud can occur in many forms, such as through fake tickets and the copying and sale of a legitimate ticket multiple times. In many instances, a purchaser of a fraudulent ticket may be none the wiser until they attempt to attend the event and get turned away at the entrance, being told their ticket is fraudulent or has already been taken for entry into the event. In these instances, the victim often has no recourse, resulting in significant economic harm as well as emotional damage from being the victim of fraud in addition to missing the exclusive event, which can be a once-in-a-lifetime opportunity for the victim.

As a result, many venues and ticket vendors attempt measures to prevent ticket resale fraud. These measures typically include the prohibition of ticket resale, the tying of tickets to government-issued identification, or limiting ticket resale to authorized platforms. However, these solutions can be difficult and expensive to implement, rendering them inefficient or unobtainable, particularly for smaller venues, or prevent ticket resale entirely, which can be detrimental to individuals that spend hard-earned money for an event they end up being unable to attend. Existing ticket resale setups lack transparency into the resale chain which, as discussed above, provides room for bad actors (e.g., fraudulent practices) to exploit the systems. Thus, there is a need for an improved technological solution (i.e., a secure, transparent and accountable ticketing system) that can facilitate ticket resale while preventing fraud and in a manner that can be easily implemented for any venue or ticketing merchant.

SUMMARY

The present disclosure provides a description of systems and methods for secure ownership and transfer of a digital token. A ticketing merchant can register an event with a platform that uses digital tokens to track ownership of digital tickets for that event. When a ticket is sold, device data for the computing device to which the ticket is sold is captured and provided to the platform. The platform issues a digital token that is associated with the computing device to the ticketing merchant for provisioning to the computing device along with the ticket. The digital token can be securely stored on the device and must be presented when the accompanying ticket is to be used, preventing an unauthorized copy of that ticket to allow entry to the event. For resale of the ticket, the computing device can get authorization from the platform and then proceed with transferring the ticket and the authorization to another device. The other device can provide the authorization to the platform, which can validate the authorization, and then change the registered ownership to the new device, which can be verified by the new device with the platform, ensuring the purchaser that the resold ticket is legitimate. As a result, ticket resale fraud can be prevented with minimal adoption and implementation costs for venues and ticketing merchants.

A method for secure ownership transfer of a digital token includes: receiving, by a receiver of a processing server, a token request from a first computing device, the token request including at least first device data; generating, by a processor of the processing server, a digital token; storing, in a memory of the processing server, the generated digital token and first device data; transmitting, by a transmitter of the processing server, the generated digital token to the first computing device in response to the received token request; receiving, by the receiver of the processing server, a transaction message for a payment transaction, wherein the transaction message includes at last one data element storing a token value; validating, by the processor of the processing server, the token value; and replacing, in the memory of the processing server, the stored first device data with second device data after successful validation of the token value.

A system for secure ownership transfer of a digital token includes a first computing device and a processing server, the processing server including: a receiver receiving a token request from the first computing device, the token request including at least first device data; a processor generating a digital token; a memory storing the generated digital token and first device data; and a transmitter transmitting the generated digital token to the first computing device in response to the received token request, wherein the receiver of the processing server receives a transaction message for a payment transaction, the transaction message including at last one data element storing a token value, the processor of the processing server validates the token value, and the memory of the processing server replaces the stored first device data with second device data after successful validation of the token value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Secure Ownership and Transfer of Digital Tickets

Figure 1:
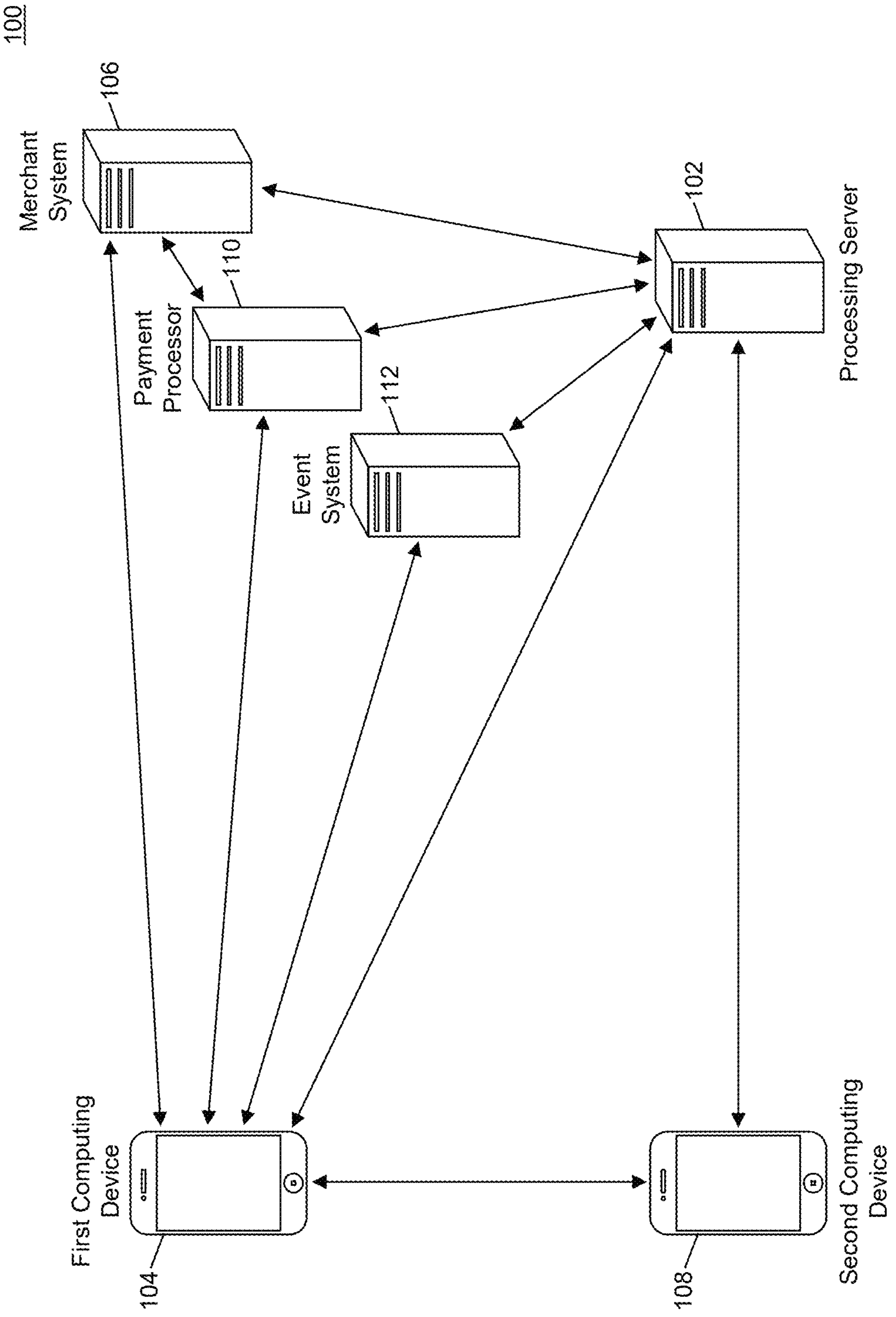
FIG. 1 is a block diagram illustrating a high level system architecture for secure ownership and transfer of a digital ticket in accordance with exemplary embodiments.

FIG. 1 illustrates a system 100 for the secure ownership and transfer of digital tickets through the use of digital tokens registered with a centralized platform. The system 100 can include a processing server 102. The processing server 102, discussed in more detail below, can operate the centralized platform that can be used to provision digital tokens for use in the authorized purchase, resale, and redemption of digital tickets for an event.

In the system 100, an individual can be interested in purchasing a ticket to an event. The individual can utilize a first computing device 104 in order to make a purchase of a digital ticket that will be used in order to attend the event. As discussed herein, the first computing device 104 can refer to the physical device itself as well as the user of the physical device that interacts therewith. The first computing device 104 can be any type of computing device configured to perform the functions discussed herein, such as a cellular phone, smart phone, smart watch, wearable computing device, implantable computing device, etc.

To purchase a ticket, the first computing device 104 can interact with a merchant system 106. The merchant system 106 can be a computing system of the venue at which the event is held, a ticketing platform that sells event tickets on behalf of a venue or performer, or any other suitable system. The first computing device 104 can interact with the merchant system 106 using any suitable method, such as via a webpage, application program, application programming interface, etc. Using the method, the first computing device 104 can select one or more tickets for purchase from the merchant system 106. In order to purchase the tickets, the first computing device 104 can convey payment data to the merchant system 106 (e.g., payment card number, account number, routing number, and/or other details used in the processing of a payment transaction) as well as device data associated with the first computing device 104. The device data can include one or more data values that are associated with the first computing device 104 that are either individually unique to the first computing device 104 or unique to the first computing device 104 when taken in combination with the other data values. The data values included in the device data can include, for example, telephone number, media access control (MAC) address, registration number, serial number, International Mobile Equipment Identity (IMEI) number, etc.

The merchant system 106 can receive the payment data and device data from the first computing device 104 and initiate a payment transaction for the purchase of the tickets using the received payment data. The payment transaction can be processed by a payment processor 110, discussed in more detail below. If payment is successful, the merchant system 106 can electronically transmit the device data for the first computing device 104 to the processing server 102 in a request for a digital token. In some embodiments, the request can also include data associated with the purchased tickets, such as an event identifier and seat information. The merchant system 106 and processing server 102 can communicate using any suitable communication network and method, such as via the Internet, a local area network, a wide area network, a direct communication channel, etc. In some cases, communications between any component and the processing server 102 can be encrypted using any suitable method.

The processing server 102 can receive the request and generate a digital token for each purchased ticket. The digital token can be an alphanumeric value of sufficient length that ensures that the digital token will be unique for that specific ticket among all other tickets for all other events registered with the processing server 102. In some cases, the digital token value can be randomly generated by the processing server 102. In other cases, the digital token can utilize event and/or ticket data in the generation of the digital token. Once the digital token has been created for a ticket, the processing server 102 can store the digital token, the device data associated with the first computing device 104, and any received event and/or ticket data in a memory thereof. The processing server 102 can repeat the process for every ticket purchased by the first computing device 104 as indicated in the received request. The processing server 102 can then electronically transmit the digital tokens to the merchant system 106, which can then provision the digital tokens and associated digital tickets to the first computing device 104. The first computing device 104 can receive the digital tickets and digital tokens and store them in memory therein. In some embodiments, the first computing device 104 can store digital tokens in a secure element of the device.

When it comes time to attend the event, the first computing device 104 can present the digital tickets for the event to an event system 112. The event system 112 can be a computing system used by the venue that is configured to receive digital tickets and data associated with digital tokens as discussed herein. In addition to the digital tickets, the first computing device 104 can provide a hash value of the digital tokens for each ticket. The hash value can be generated by hashing the digital token via a one-way hashing algorithm such that the digital token cannot be generated from the resulting hash value. The first computing device 104 can electronically transmit the digital tickets and hash values to the event system 112 using any suitable method, such as radio frequency, near field communication, display of a quick response (QR) code that is read and decoded by the event system 112, etc.

Once the event system 112 has received the hash values and digital tickets, the event system 112 can electronically transmit the received hash values and ticket data to the processing server 102 using a suitable communication network and method. The processing server 102 can receive the hash values and ticket data and verify that the first computing device 104 is the authorized owner of the tickets presented for entry to the event. The verification can be performed by the processing server 102 by identifying the digital tokens associated with each of the presented tickets using the ticket data, hashing each of the identified digital tokens using the one-way hashing algorithm, and then comparing the resulting hash values with the hash values transmitted by the event system 112. If the hash values match, it indicates that the first computing device 104 is in possession of the unique digital tokens associated with each of the presented tickets. The processing server 102 can electronically transmit a notification message to the event system 112 indicating that the validation is successful, and the event system 112 can provide entry to the event to the first computing device 104 for use of the presented tickets. If the hash values do not match, the processing server 102 can transmit a notification message to the event system 112 indicating that the validation failed.

In some cases, the event system 112 and/or processing server 102 can track usage of digital tickets for an event. In such cases, after a successful validation of a presented hash value for a digital ticket, the processing server 102 and/or event system 112 can store a status notification associated with the digital ticket indicating that the ticket has already been redeemed. In such a case, a future attempt to redeem the same digital token can be denied without the need to repeat a comparison of hash values. In some cases, a digital ticket may be able to be redeemed multiple times, such as for re-entry to an event or for events occurring on multiple dates (e.g., multi-day festivals, season tickets, etc.). In such cases, the creation, transmission, and validation of hash values can be repeated each time to ensure proper ownership and use of the digital ticket.

In the system 100, the first computing device 104 may be interested in reselling a purchased digital ticket. In such an instance, the first computing device 104 can identify a second computing device 108 that is interested in purchasing the digital ticket therefrom. As discussed herein, likewise with the first computing device 104, the second computing device 108 can refer to a physical device or a user thereof and can be any type of computing device configured to perform the functions discussed herein. The first computing device 104 and second computing device 108 can identify one another using any suitable method, such as via a ticketing resale platform, social media, etc. The first computing device 104 and second computing device 108 can exchange data (e.g., selling price, offer price etc.) using any suitable communication method.

In some embodiments, the second computing device 108 can be interested in verifying the ownership of the digital ticket by the first computing device 104 prior to agreeing to purchase the ticket. In such embodiments, the first computing device 104 can generate a hash value using the digital token and transmit the hash value to the second computing device 108, such as in the same manner used in the redemption of the ticket with the event system 112, as discussed above. The second computing device 108 can receive the hash value and electronically transmit the hash value to the processing server 102 with the ticket data using a suitable communication network and method. The processing server 102 can validate the received hash value using the method discussed above and provide a notification message to the second computing device 108 indicating if the validation was successful or failed. Upon receipt of a notification message of a successful validation, the second computing device 108 can be assured that the first computing device 104 is the genuine and legitimate owner of the digital ticket and that the resale is not fraudulent.

In order to initiate the transfer in ownership of the digital ticket, the first computing device 104 can submit a surrender token request to the processing server 102. The surrender token request can include a hash value for the digital token and the accompanying ticket data, which can be validated by the processing server 102 to ensure that the request is coming from the owner of the digital ticket for which surrender is being requested. Upon successful validation, the processing server 102 can generate an authorization key, also referred to herein as a surrender token, which can be a new digital token that is unique for the digital ticket and separate from the initial digital token provisioned to the first computing device 104 and generated in a similar or the same fashion. The processing server 102 can electronically transmit the authorization key to the first computing device 104 in response to the surrender token request. The processing server 102 can also store the authentication key with the digital token and ticket data in memory thereof.

In some embodiments, the processing server 102 can store a hold status notification with the digital ticket after receiving the surrender token request. In such embodiments, the processing server 102 can include the status notification in notification messages sent to parties (e.g., second computing devices 108) checking ownership of the digital ticket, which can indicate that the first computing device 104 is interested in transferring ownership of the digital ticket. In some cases, redemption of the digital ticket can be denied until the hold status notification has been removed, such as after sale of the digital ticket and registration of ownership by a new device or after the first computing device 104 requests removal of the hold status, discussed below.

To facilitate the transfer of the digital ticket to the second computing device 108, the first computing device 104 can electronically transmit the authorization key thereto using a suitable communication network and method. The first computing device 104 or second computing device 108 can then initiate a payment transaction for payment from the second computing device 108 to the first computing device 104 in exchange for the digital ticket. The payment transaction can be processed via a payment processor 110. The payment processor 110 can be any entity that is configured to facilitate payments from one transaction account to another. Payment processors 110 can include payment networks, such as those operated by VISA®, MasterCard®, PayPal®, Zelle®, etc., other payment services, such as Venmo®, CashApp, etc., wire transfer services, etc.

In order to register transfer of ownership of the digital ticket, a hash value of the authorization key can be electronically transmitted to the processing server 102. In some embodiments, the second computing device 108 can directly transmit the hash value of the authorization key to the processing server 102. In other embodiments, the second computing device 108 can include the hash value of the authorization key in data provided to the payment processor 110 when initiating the transfer of payment to the first computing device 104. In such embodiments, the hash value of the authorization key can be included in a data element in a transaction message that is used in the processing of the payment transaction. The processing server 102 can receive the transaction message from the payment processor 110 and identify the hash value in the appropriate data element included therein. The processing server 102 can receive the hash value of the authentication key and validate the hash value by generating a separate hash value of its stored authentication key and comparing the two hash values for a match. Upon successful validation, the processing server 102 can indicate in its memory that the ownership of the digital ticket has transferred to a new device. In some instances, the device data for the second computing device 108 can accompany the hash value in the transmission from the second computing device 108 or the transaction message. In such instances, the device data for the second computing device 108 can be stored with the ticket data indicating ownership by the second computing device 108. In other instances, the second computing device 108 can separately transmit device data associated therewith to the processing server 102, such as can be accompanied by a new hash value of the authentication key for validation to ensure that the device submitting the device data is the new authorized owner of the digital ticket.

Once the new ownership has been registered, redemption of the digital ticket can only be performed by presentation of a hash value of the authentication key, such as to prevent attempted redemption by the first computing device 104 using the original digital token. In such cases, the authentication key has effectively replaced the digital token as the token value used to prove ownership of the digital ticket. In some embodiments, redemption of a digital ticket for which an authentication key has been generated may require the hash value of the authentication key to be accompanied by device data, such as to ensure that the hash value is being provided by the second computing device 108 and not an attempt by the first computing device 104 to redeem the ticket using the authentication key. In other embodiments, the processing server 102 can generate a new digital token that can be directly provisioned to the second computing device 108 once the change in ownership has been registered, where the new digital token can replace the original digital token and be used in redemption using the process discussed above. Once the second computing device 108 has registered ownership of the digital ticket, the second computing device 108 can transfer ownership to another computing device using the same processes used to transfer ownership from the first computing device 104 to the second computing device 108.

In cases where the first computing device 104 may decide to refrain from reselling the digital ticket, the first computing device 104 can submit a request to remove the hold status notification to the processing server 102. The request can include the hash value of the authentication key and, if necessary, the device data of the first computing device 104. The processing server 102 can validate the hash value using the processes discussed above and then remove the hold status notification.

In some embodiments, the processing server 102 can utilize a blockchain for the storage of digital tokens and accompanying device and ticket data. The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node in a blockchain network prior to the generation and addition of a new block to the blockchain in order for the change to be made permanent. Computational and communication limitations can make such a modification exceedingly difficult, if not impossible, thus rendering the blockchain immutable.

Each blockchain data value stored in the blockchain can correspond to a blockchain transaction or other storage of data, as applicable. In the system 100, the processing server 102 can store a digital token, ticket data, and device data for a digital ticket in a blockchain data value on the blockchain. In some cases, the processing server 102 can use separate blockchains for each event. In other cases, data for multiple events can be stored in a single blockchain, where the ticket data can indicate the event to which a particular digital token is associated. In these embodiments, a new blockchain data value can be created and added to the blockchain when the status of a digital ticket has been changed (e.g., a hold status notification has been added or removed, ownership has been transferred, etc.), where the blockchain data value can include the status notification, authentication key, new digital token, or other data, as necessary. A blockchain can be used to ensure that the data stored is immutable to prevent any attempt to change device data, ticket data, or digital tokens.

In some embodiments, smart contracts can be used on conjunction with a blockchain to facilitate one or more of the functions of the processing server 102 discussed herein. A smart contract can be an executable program that is stored on the blockchain and configured to self-execute once one or more criteria have been met. In the system 100, a smart contract can be added to the blockchain along with a new blockchain data value for a purchased digital ticket. The smart contract can be configured to add a hold status notification when a surrender token request is input, remove a hold status notification when requested by a first computing device 108, transfer ownership upon receipt of a transaction message, etc. In some cases, the smart contract can be configured to perform validations of hash values, where the smart contract itself may be configured to generate the hash values, or may receive the hash values as input, such as from the processing server 102.

The following examples provide for example programming code and pseudo code for some of the functions of the processing server 102 as discussed herein. In one example, device data for a first computing device 104 can include a plurality of different data values capturing data about the device itself as well as the communication method used to interact with the merchant system 106 and/or processing server 102. Such parameters can be captured using the following language:

```
{
  "device_model": "Samsung Galaxy S24",
  "manufacturer": "Samsung",
  "os": "Android",
  "os_version": "14",
  "screen_resolution": "1080x2400",
  "processor_architecture": "ARM64",
  "network_info": {
    "ip_address": "172.161.14.285",
    "mac_address": "00:7A:2B:8D:2B:1E"
  },
  "browser_info": {
    "browser_type": "Chrome",
```

-continued

```
    "browser_version": "96.0.4664.45"
  },
  "language": "en-US",
  "hardware_info": {
    "camera_specifications": "12 MP + 64 MP + 12 MP",
    "storage_capacity": "128 GB",
    "ram": "8 GB"
  }
}
```

The parameters of the device data can then be hashed into a single value to be used as the device data by the processing server 102 in performing validations, as discussed above. The hashing can be performed using the following function:

```
function hashMobileDetails(string memory
_deviceParameters) public pure
returns (bytes32) {
    return sha256(bytes(_deviceParameters));
}
```

In embodiments where a blockchain is used, a smart contract can be created that has functionality to perform the functions of the processing server 102 as discussed above. In such embodiments, the following language can be used to perform functions in the smart contract as indicated:

```
contract TicketBlock {
  struct Event {
    uint256 index;
    uint256 timestamp;
    uint256 amount;
    address sender; // e.g., first computing device 104
    address recipient; // e.g., second computing deice 108
    string venue;
    string deviceSignature; // hashed device data from hashMobileDetails
    string activationStatus;
  }
  event CreateTicket(uint256 timestamp ,uint256 amount, address sender,
address recipient, string venue, string deviceSignature,string activationStatus);
  BlockEvent[ ] event; // this array will keep track of tickets issued under one
event
  uint256 ticketCounter = 0; // number of issued tickets
  function addTicketToEvent(uint256 amount, address payable recipient, string
venue, string deviceSignature,string activationStatus) public {
    ticketCounter += 1;
    // add ticket sold transaction to event
    event.push(
      BlockEvent(
        ticketCounter,
        event.timestamp,
        amount,
        msg.sender,
        recipient
      )
    );
    //Calling createTicket Event whenever a new owner buys ticket
    emit CreateTicket (amount, msg.sender, recipient, string venue, string
deviceSignature,string activationStatus);
  }
  //This function return the details of individual ticket
  function getTicket( ) public view returns (BlockEvent[ ] memory) {
    return event;
  }
  //This function returns the no. of ticket stored in event
  function getTicketCount( ) public view returns (uint256) {
    return ticketCounter;
    }
}
```

The methods and systems discussed herein provide for the secure ownership and transfer of digital tickets through the use of a digital token and a centralized platform (i.e., processing server). By using a digital token, device data, and hashing techniques, a digital ticket can be issued to a device that can only be redeemed by that device. Copies of the digital ticket cannot be redeemed and ownership of a digital ticket available for resale can be easily verified by any interested party, removing the ability for a ticket to be fraudulently copied or resold multiple times. As a result, all ticket purchasers can be protected including those who initially purchase a ticket for which a fraudster attempts to copy and redeem before the legitimate purchaser, as well as those who purchase a resold ticket. In addition, the methods and systems can be implemented with minimal adjustment by merchant system 106, event systems 112, computing devices to ensure that the benefits can be secured for participants and venues without significant economic or computational impact. The result is a significant technological improvement over existing systems.

Processing Server

Figure 2:
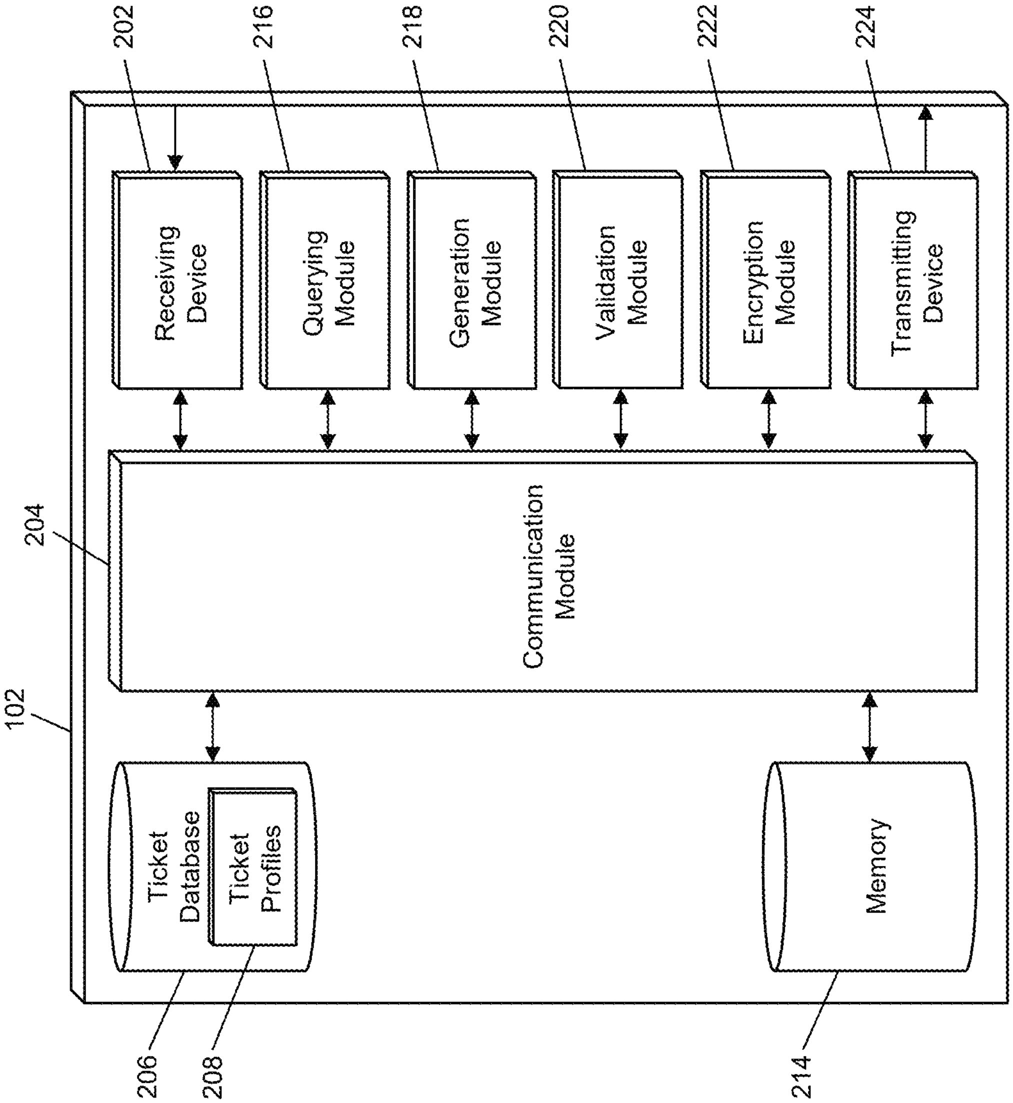
FIG. 2 is a block diagram illustrating the processing server in the system of FIG. 1 for the secure ownership and transfer of a digital ticket in accordance with exemplary embodiments.

FIG. 2 illustrates an embodiment of the processing server 102. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 600 illustrated in FIG. 6 and discussed in more detail below can be a suitable configuration of the processing server 102.

The processing server 102 can include a receiving device 202. The receiving device 202 can be configured to receive data over one or more networks via one or more network protocols. In some instances, the receiving device 202 can be configured to receive data from computing devices 104 and 108, merchant systems 106, payment processors 110, event systems 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by first computing devices 104, second computing devices 108, and event systems 112 that are superimposed or otherwise encoded with hash values, surrender token requests, hold status removal requests, ownership validation requests, device data, digital ticket data, etc. The receiving device 202 can also be configured to receive data signals electronically transmitted by merchant systems 106 that can be superimposed or otherwise encoded with digital token request, which can include device data, ticket data, and event data. The receiving device 202 can also be configured to receive data signals electronically transmitted by payment processors 110 that can be superimposed or otherwise encoded with transaction messages, which can include a data element that includes a hash value generated from a digital token or authentication key.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, encryption module 222, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can also include a ticket database 206. The device database 206 can be configured to store one or more ticket profiles 208 using a suitable data storage format and schema. The ticket database 206 can be a relational database that utilizes structured query language for the storage, identification, modifying, updating, accessing, etc. of structured data sets stored therein. Each ticket profile 208 can be a structured data set configured to store data related to a digital ticket, which can include device data, a digital token, one or more authentication keys, event data, status notifications, and any other data as discussed herein.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, configuration keys, cryptographic keys including public keys and/or private keys, communication data, blockchain algorithms and data, encryption algorithms, etc.

The processing server 102 can include a querying module 216. The querying module 216 can be configured to execute queries on databases to identify information. The querying module 216 can receive one or more data values or query strings and can execute a query string based thereon on an indicated database, such as the ticket database 206 of the processing server 102 to identify information stored therein. The querying module 216 can then output the identified information to an appropriate engine or module of the processing server 102 as necessary. The querying module 216 can, for example, execute a query on the ticket database 206 to identify a ticket profile 208 for identifying a digital token for use in validating an attempted entry at an event using a digital ticket.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate blockchain data entries, blocks, encryption keys, digital tokens, authentication keys, hash values, notification messages, status notifications, etc.

The processing server 102 can also include a validation module 220. The validation module 220 can be configured to perform data validations and verifications for the processing server 102 as part of the functions discussed herein. The validation module 220 can receive instructions as input, can perform data validations or verification as instructed, and can output a result of the data validations or verifications to one or more modules of the processing server 102. In some cases, the input can include the data to be validated or verified and/or data to be used in the validation or verification. In other cases, the validation module 220 can be configured to identify such data, such as in the ticket database 206 and/or memory 214. The validation module 220 can be configured to, for example, validate new blockchain data entries and/or blocks, verify digital signatures, validate device data, validate hash values, validate ticket status, etc.

The processing server 102 can also include an encryption module 222. The encryption module 222 can be configured to encrypt and/or decrypt data for the processing server 102 as part of the functions discussed herein. The encryption module 222 can receive instructions as input, can encrypt or decrypt data as instructed, and can output a result of the encryption or decryption to one or more modules of the processing server 102. In some cases, the input can include the data to be encrypted or decrypted and/or keys for use in the encryption or decryption. In other cases, the encryption module 222 can be configured to identify such data, such as in the memory 214. The encryption module 222 can be configured to encrypt and decrypt device data, digital tokens, authentication keys, and other messages electronically transmitted from or received by the processing server 102.

The processing server 102 can also include a transmitting device 224. The transmitting device 224 can be configured to transmit data over one or more networks via one or more network protocols. In some instances, the transmitting device 224 can be configured to transmit data to computing devices 104 and 108, merchant systems 106, event systems 112, and other entities via one or more communication methods, local area networks, wireless area networks, cellular communication, Bluetooth, radio frequency, the Internet, etc. In some embodiments, the transmitting device 224 can be comprised of multiple devices, such as different transmitting devices for transmitting data over different networks, such as a first transmitting device for transmitting data over a local area network and a second transmitting device for transmitting data via the Internet. The transmitting device 224 can electronically transmit data signals that have data superimposed that can be parsed by a receiving computing device. In some instances, the transmitting device 224 can include one or more modules for superimposing, encoding, or otherwise formatting data into data signals suitable for transmission.

The transmitting device 224 can be configured to electronically transmit data signals to first computing devices 104, merchant systems 106, second computing devices 108, and event systems 112 that can be superimposed or otherwise encoded with digital tokens, authentication keys, status notifications, validation results, notification messages, etc.

Process for Purchase and Ownership Registration of a Digital Ticket

Figure 3:
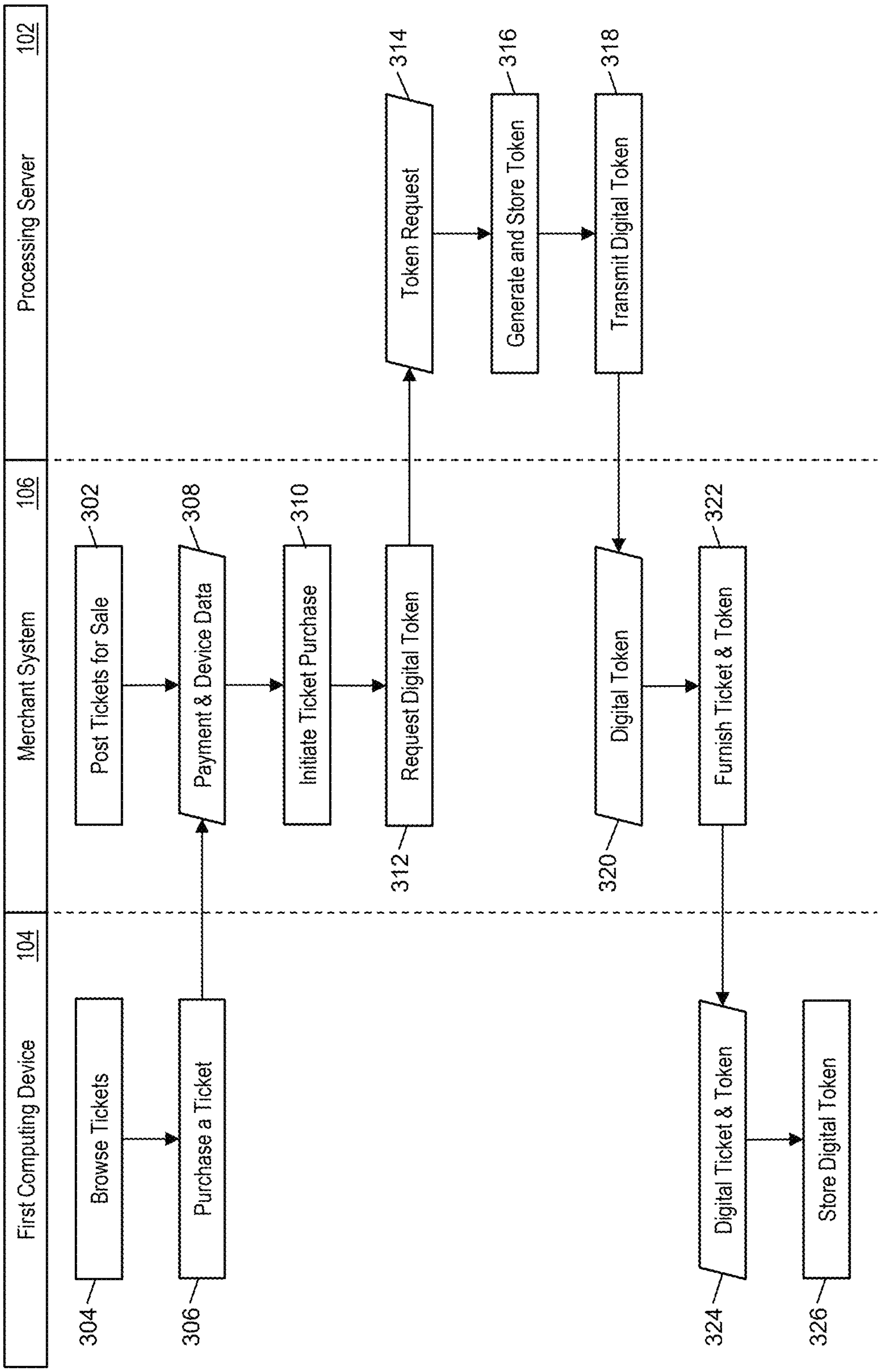
FIG. 3 is a flow diagram illustrating a process for the purchase and registration of a digital token for a ticket in the system of FIG. 1 in accordance with exemplary embodiments.

FIG. 3 illustrates a process in the system 100 of FIG. 1 for the purchase of a digital ticket and registration of ownership thereof to the first computing device 104 using a digital token from the processing server 102.

In step 302, the merchant system 106 can post tickets available for sale for an event for selection and purchase by potential attendees. The merchant system 106 can use a webpage, application program, social media, or other suitable method. In step 304, the first computing device 104 can browse the tickets that are available through the merchant system 106 and the user thereof can select a ticket for purchase for an upcoming event. In step 306, the first computing device 106 can electronically transmit payment details for a transaction account to be used to fund the purchase of the ticket as well as device data associated with the first computing device 104 to the merchant system 106. In step 308, the merchant system 106 can receive the payment details and device data from the first computing device 104.

In step 310, the merchant system 106 can initiate a payment transaction for the purchase of the ticket using the supplied payment data. Once the purchase has been completed, then, in step 312, the merchant system 106 can submit a request for a digital token to be associated with the purchased ticket using a suitable communication network and method. The request can include at least the device data received from the first computing device 104 and ticket data associated with the purchased ticket, such as an event identifier, seat information, etc. In step 314, the receiving device 202 of the processing server 102 can receive the digital token request.

In step 316, the generation module 218 of the processing server 102 can generate a digital token for the purchased ticket and the querying module 216 of the processing server 102 can execute a query on the ticket database 206 to create a ticket profile 208 for the purchased ticket that includes the generated digital token, device data, and ticket data. In some embodiments, the processing server 102 can store the ticket profile 208 in a blockchain data entry in a blockchain, which, in some instances, can be unique to the event for which the ticket was purchased. In step 318, the transmitting device 224 of the processing server 102 can electronically transmit the generated digital token to the merchant system 106 as a response to the received digital token request. In step 320, the merchant system 106 can receive the digital token.

In step 322, the merchant system 106 can electronically transmit the purchased ticket for the event as well as the digital token to the first computing device 104. In step 324, the first computing device 104 can receive the ticket and digital token and, in step 326, the first computing device 104 can store the ticket and digital token in the device. In some embodiments, the digital token can be stored in a secure element where it can only be accessed by an application program associated with the platform provided by the processing server 102 for secure ownership and transfer of digital tickets.

Process for Ownership Transfer of a Digital Ticket

Figure 4A:
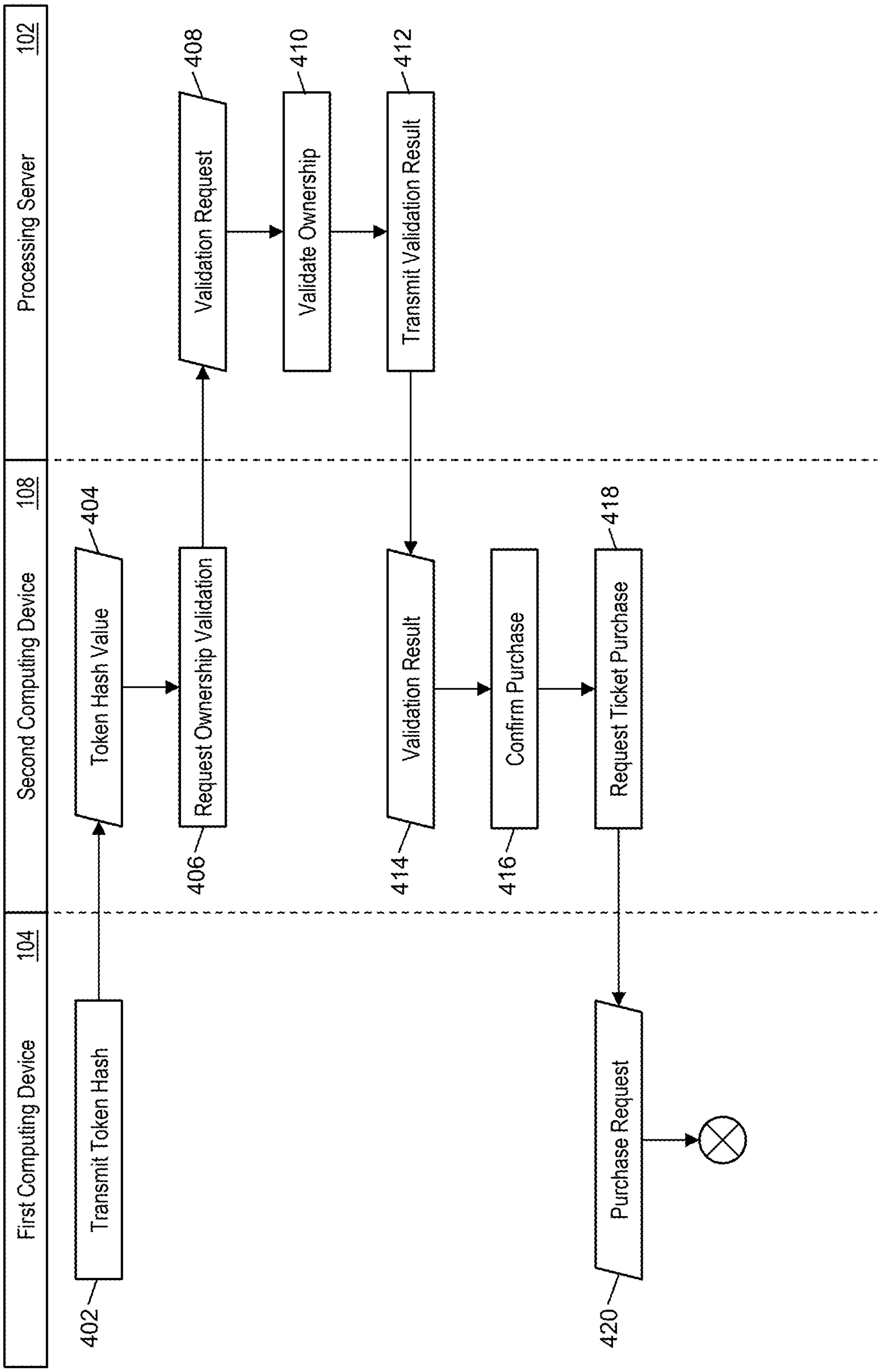
FIGS. 4A and 4B are a flow diagram illustrating a process for the resale of a ticket with accompanying digital token in the system of FIG. 1 in accordance with exemplary embodiments.
Figure 4B:
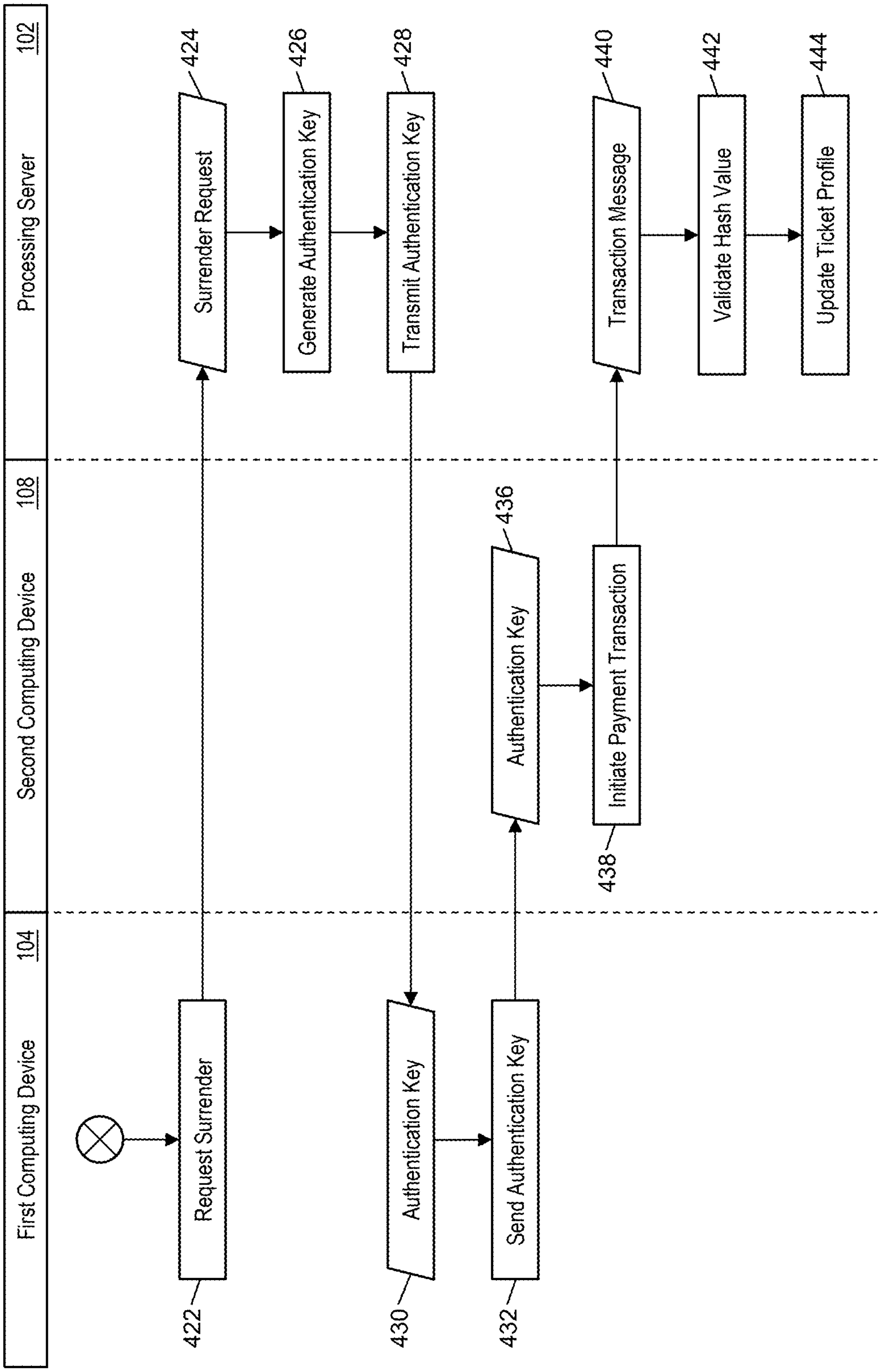

FIGS. 4A and 4B illustrate a process in the system 100 of FIG. 1 for the transfer of ownership of a digital ticket from the first computing device 104 to the second computing device 108 using digital tokens from the processing server 102.

Prior to agreeing to purchase a ticket, the second computing device 108 can be interested in ensuring that the first computing device 104 has a genuine ticket and is the genuine owner of that ticket. To accommodate, in step 402, the first computing device 104 can generate a hash value of the digital token stored in the secure element thereof that corresponds to the digital ticket of interest and electronically transmit the hash value, as well as the ticket data associated with the ticket, to the second computing device 108 using a suitable communication network and method. In some cases, the first computing device 104 can also provide its device data to the second computing device 108 for use in the validation. In step 404, the second computing device 108 can receive the hash value and, in step 406, submit an ownership validation request to the processing server 102 using a suitable communication network and method, such as via an application program associated with the platform of the processing server 102. The ownership verification request can include the hash value and ticket data provided by the first computing device 104, as well as any included device data.

In step 408, the receiving device 202 of the processing server 102 can receive the ownership validation request. In step 410, the processing server 102 can validate the first computing device's ownership of the ticket. Validation of the ticket can include the generation (e.g., by the generation module 218 of the processing server 102) of a new hash value using the digital token stored in a ticket profile 208 that matches the ticket data included in the request and a comparison (e.g., by the validation module 220 of the processing server 102) of the new hash value to the hash value included in the request to ensure a match. In cases where device data is included in the request, the validation can further include matching the device data included in the request with the device data stored in the ticket profile 208. After the validation has been completed, in step 412, the transmitting device 224 of the processing server 102 can electronically transmit a notification message to the second computing device 108 with the validation result in response to the received ownership validation request.

In step 414, the second computing device 108 can receive the notification message with the result that the validation was successful from the processing server 102, which can be displayed to the user thereof to inform the user that the ticket being offered for sale from the first computing device 104 is genuine. In step 416, a user of the second computing device 108 can provide an instruction that they are interested in going forward with a purchase of the ticket. In step 418, the second computing device 108 can submit a ticket purchase request to the first computing device 104 indicating that they are interested in purchasing the ticket, which can be done using any suitable method, such as via a ticket resale platform, social media, the application program of the platform associated with the processing server 102, etc. The ticket purchase request can include the agreed upon amount and device data associated with the second computing device 108.

In step 420, the first computing device 104 can receive the purchase request from the second computing device 108 with the device data associated therewith. In step 422, the first computing device 104 can electronically transmit a surrender token request to the processing server 102, to indicate that the first computing device 104 is interested in selling the ticket. In step 424, the receiving device 202 of the processing server 102 can receive the surrender token request. In some embodiments, the first computing device 104 can generate a hash value of the digital token and provide the hash value and the device data of the first computing device 104 with the surrender token request, for validation by the processing server 102 upon receipt of the surrender token request. In step 426, the generation module 218 of the processing server 102 can generate an authentication key that is stored in the ticket profile 208 for the ticket being transferred. In step 428, the transmitting device 224 of the processing server 102 can electronically transmit the authentication key to the first computing device 104 in response to the surrender token request.

In step 430, the first computing device 104 can receive the authentication key from the processing server 102. In some embodiments, steps 422 through 430 can occur before step 402. In such embodiments, the processing server 102 can store a hold status notification in the ticket profile 208 for the ticket that indicates that the ticket is being held for a potential purchase, which can be provided to the second computing device 108 in the notification message sent in step 412, to indicate that the first computing device 104 is genuinely making the ticket available for resale. In step 432, the first computing device 104 can electronically transmit the authentication key to the second computing device 108 for receipt thereby, in step 436.

In step 438, the second computing device 108 can initiate a payment transaction for payment of the agreed upon transaction amount to the first computing device 104 for purchase of the ticket. The second computing device 108 can a hash value of the authentication key as well as ticket data for the ticket and device data for the second computing device 108 in data accompanying the payment transaction. The data can be included in one or more data elements included in a transaction message used in the processing of the payment transaction, such as by a payment processor 110. In step 440, the receiving device 202 of the processing server 102 can receive a copy of the transaction message. In some embodiments, the processing server 102 can be a part of a payment processor 110 used in the processing of payment transactions, including the payment transaction for the resale purchase of the ticket by the second computing device 108 from the first computing device 104.

In step 442, the processing server 102 can validate the hash value included in the transaction message by identifying (e.g., by the querying module 216 of the processing server 102) a ticket profile 208 using the ticket data included in the transaction message, generating (e.g., by the generation module 218 of the processing server 102) a hash value of the authentication key stored in the identified ticket profile 208, and validating (e.g., by the validation module 220 of the processing server 102) that the generated hash value matches the hash value included in the received transaction message. Upon successful validation, in step 444, the querying module 216 of the processing server 102 can update the ticket profile 208 for the ticket to indicate the change in ownership by replacing the device data of the first computing device 104 with the device data of the second computing device 108 and replacing the digital token with the authentication key as a new digital token for the associated ticket.

Exemplary Method for Secure Ownership Transfer of a Digital Ticket

Figure 5:
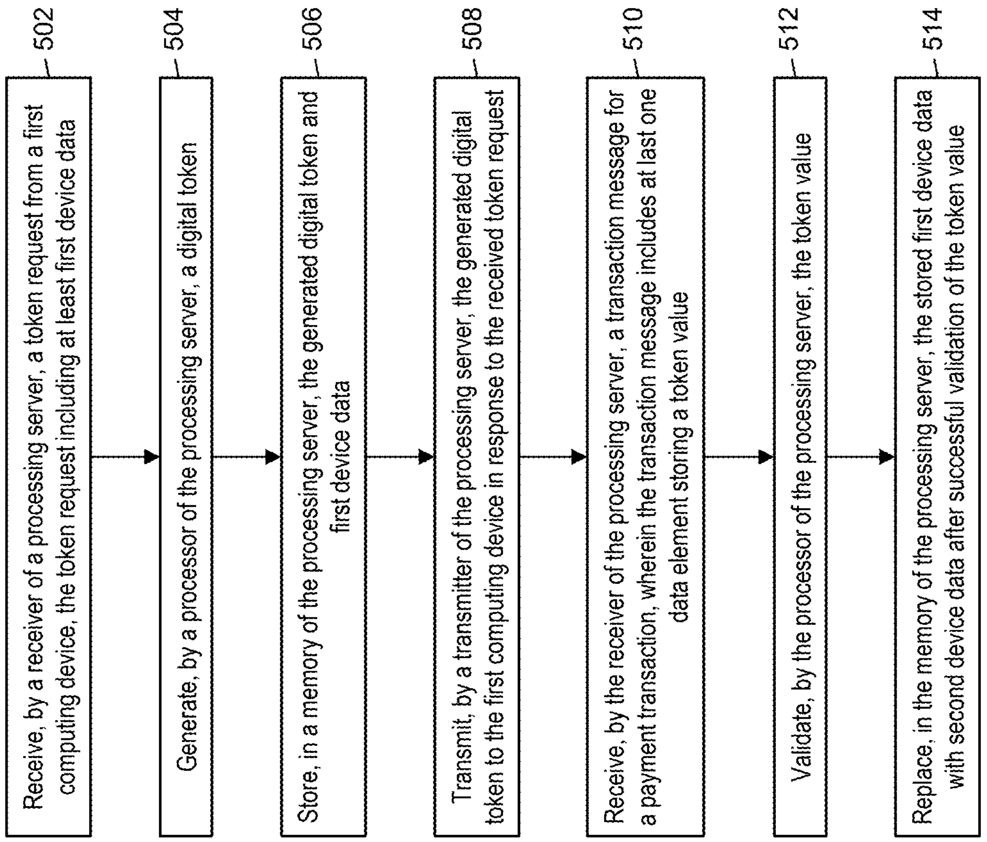
FIG. 5 is a flow chart illustrating an exemplary method for secure ownership and transfer of a digital token in accordance with exemplary embodiments.

FIG. 5 illustrates a method 500 for the secure ownership transfer of a digital ticket through the use of a digital token.

In step 502, a token request can be received by a receiver (e.g., receiving device 202) of a processing server (e.g., processing server 102) from a first computing device (e.g., merchant system 106) where the token request includes at least first device data. In step 504, a digital token can be generated by a processor (e.g., generation module 218) of the processing server. In step 506, the generated digital token and first device data can be stored in a memory (e.g., ticket database 206, memory 214, etc.) of the processing server. In step 508, the generated digital token can be transmitted by a transmitter (e.g., transmitting device 224) of the processing server to the first computing device in response to the received token request.

In step 510, a transaction message for a payment transaction can be received by the receiver of the processing server, wherein the transaction message includes at least one data element storing a token value. In step 512, the token value can be validated by the processor (e.g., validation module 220) of the processing server. In step 514, the stored first device data can be replaced, in the memory of the processing server, with second device data after successful validation of the token value.

In one embodiment, validating the token value can include: generating, by the processor (e.g., generation module 218) of the processing server, a comparison hash value by hashing the stored digital token with a one-way hashing algorithm; and comparing, by the processor (e.g., validation module 220) of the processing server, the comparison hash value with the value token. In some embodiments, the method 500 can further include: receiving, by the receiver of the processing server, a verification request from a second computing device (e.g., second computing device 108), the verification request including at least a first hash value and presented device data; generating, by the processor (e.g., generation module 218) of the processing server, a second hash value by hashing the stored digital token with a one-way hashing algorithm; validating, by the processor (e.g., validation module 220) of the processing server, that the first hash value is equivalent to the second hash value and that the presented device data is equivalent to the stored first device data; and transmitting, by the transmitter of the processing server, a response message to the second computing device in response to the received verification request indicating ownership of the digital token by a device associated with the first device data. In a further embodiment, the verification request can further include the second device data, the response message can be transmitted to the second computing device prior to receiving the transaction message.

In one embodiment, the method 500 can also include receiving, by the receiver of the processing server, a surrender token request; and transmitting, by the transmitter of the processing server, the token value to a second computing device (e.g., first computing device 104) in response to the received surrender token request. In a further embodiment, the surrender token request can be received from the second computing device, and the second computing device can be associated with the first device data. In another further embodiment, the method 500 can even further include storing, in the memory of the processing server, a hold status notification associated with the stored digital token after receipt of the received surrender token request. In an even further embodiment, the method 500 can also include removing, in the memory of the processing server, the hold status notification associated with the stored digital token after replacement of the stored first device data with the second device data.

Computer System Architecture

Figure 6:
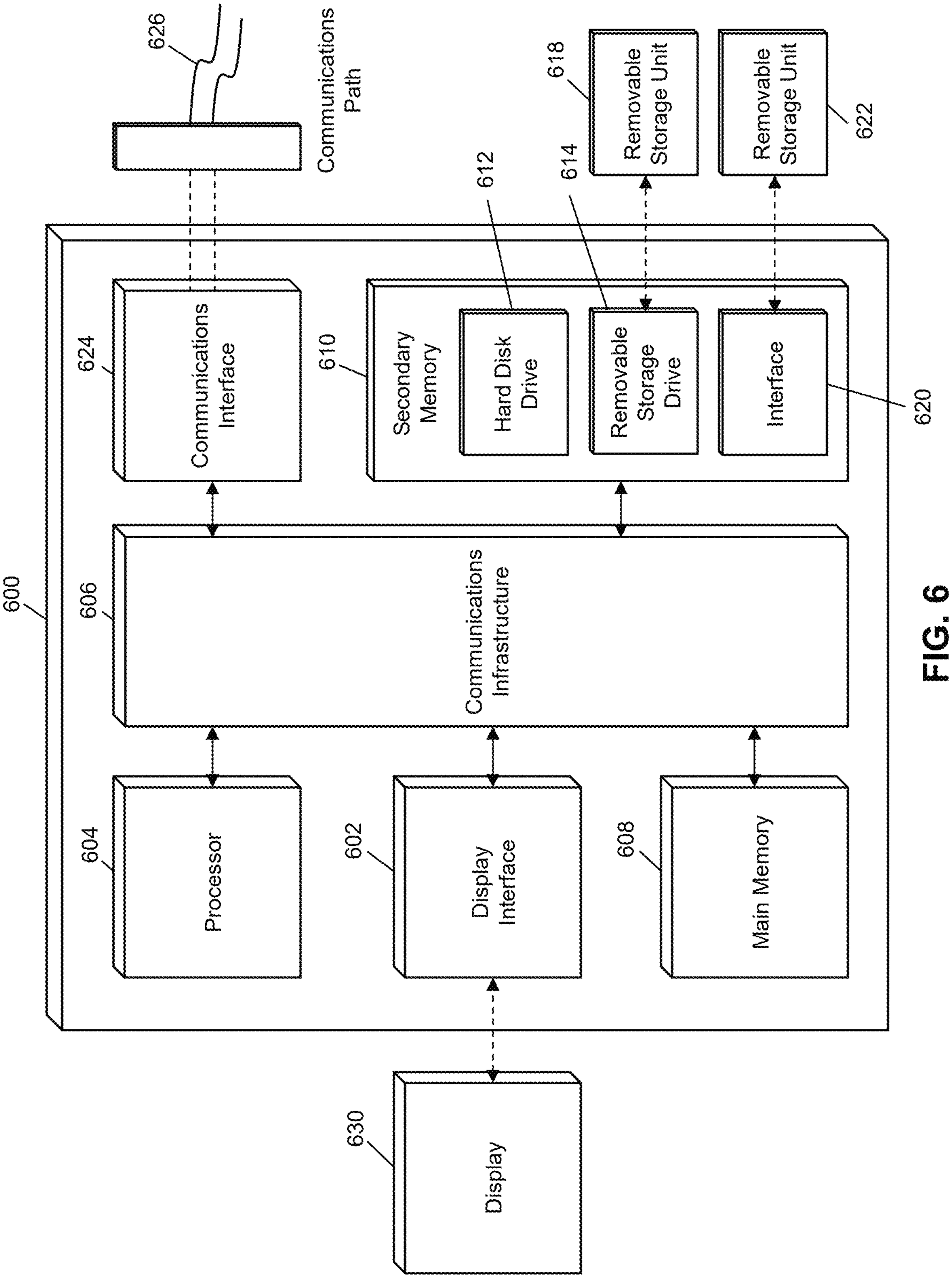
FIG. 6 is a block diagram illustrating a computer system architecture in accordance with exemplary embodiments.

FIG. 6 illustrates a computer system 600 in which embodiments of the present disclosure, or portions thereof, can be implemented as computer-readable code. For example, the processing server 102, first computing device 104, merchant system 106, second computing device 108, payment processor 110, and event system 112 can be implemented in the computer system 600 using hardware, non-transitory computer readable media having instructions stored thereon, or a combination thereof and can be implemented in one or more computer systems or other processing systems. Hardware can embody modules and components used to implement the methods of FIGS. 3, 4A, 4B, and 5.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 604 can be a special purpose or a general purpose processor device specifically configured to perform the functions discussed herein. The processor device 604 can be connected to a communications infrastructure 606, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 can also include a main memory 608 (e.g., random access memory, read-only memory, etc.), and can also include a secondary memory 610. The secondary memory 610 can include the hard disk drive 612 and a removable storage drive 614, such as a floppy disk drive, a magnetic tape drive, an optical disk drive, a flash memory, etc.

The removable storage drive 614 can read from and/or write to the removable storage unit 618 in a well-known manner. The removable storage unit 618 can include a removable storage media that can be read by and written to by the removable storage drive 614. For example, if the removable storage drive 614 is a floppy disk drive or universal serial bus port, the removable storage unit 618 can be a floppy disk or portable flash drive, respectively. In one embodiment, the removable storage unit 618 can be non-transitory computer readable recording media.

In some embodiments, the secondary memory 610 can include alternative means for allowing computer programs or other instructions to be loaded into the computer system 600, for example, the removable storage unit 622 and an interface 620. Examples of such means can include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 600 can also include a communications interface 624. The communications interface 624 can be configured to allow software and data to be transferred between the computer system 600 and external devices. Exemplary communications interfaces 624 can include a modem, a network interface (e.g., an Ethernet card), a communications port, a PCMCIA slot and card, etc. Software and data transferred via the communications interface 624 can be in the form of signals, which can be electronic, electromagnetic, optical, or other signals as will be apparent to persons having skill in the relevant art. The signals can travel via a communications path 626, which can be configured to carry the signals and can be implemented using wire, cable, fiber optics, a phone line, a cellular phone link, a radio frequency link, etc.

The computer system 600 can further include a display interface 602. The display interface 602 can be configured to allow data to be transferred between the computer system 600 and external display 630. Exemplary display interfaces 602 can include high-definition multimedia interface (HDMI), digital visual interface (DVI), video graphics array (VGA), etc. The display 630 can be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 608 and secondary memory 610, which can be memory semiconductors (e.g., DRAMs, etc.). These computer program products can be a means for providing software to the computer system 600. Computer programs (e.g., computer control logic) can be stored in the main memory 608 and/or the secondary memory 610. Computer programs can also be received via the communications interface 624. Such computer programs, when executed, can enable computer system 600 to implement the present methods as discussed herein. In particular, the computer programs, when executed, can enable processor device 604 to implement the methods illustrated by FIGS. 3, 4A, 4B, and 5, as discussed herein. Accordingly, such computer programs can represent controllers of the computer system 600. Where the present disclosure is implemented using software, the software can be stored in a computer program product and loaded into the computer system 600 using the removable storage drive 614, interface 620, and hard disk drive 612, or communications interface 624.

The processor device 604 can comprise one or more modules or engines configured to perform the functions of the computer system 600. Each of the modules or engines can be implemented using hardware and, in some instances, can also utilize software, such as corresponding to program code and/or programs stored in the main memory 608 or secondary memory 610. In such instances, program code can be compiled by the processor device 604 (e.g., by a compiling module or engine) prior to execution by the hardware of the computer system 600. For example, the program code can be source code written in a programming language that is translated into a lower-level language, such as assembly language or machine code, for execution by the processor device 604 and/or any additional hardware components of the computer system 600. The process of compiling can include the use of lexical analysis, preprocessing, parsing, semantic analysis, syntax-directed translation, code generation, code optimization, and any other techniques that can be suitable for translation of program code into a lower-level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for secure ownership and transfer of a digital token. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for secure ownership transfer of a digital token, comprising:

receiving, by a receiver of a processing server, a token request from a first computing device, via a merchant system, the token request including at least first device data associated with the first computing device;

generating, by a processor of the processing server, a digital token;

storing, in a memory of the processing server, the generated digital token and first device data;

transmitting, by a transmitter of the processing server, via the merchant system, the generated digital token to the first computing device in response to the received token request;

receiving, by the receiver of the processing server, a transaction message for a payment transaction, wherein the transaction message includes second device data associated with a second device and at last one data element storing a token value, said token value being a hash value generated by hashing the digital token;

validating, by the processor of the processing server, the token value; and replacing, in the memory of the processing server, the stored first device data with second device data after successful validation of the token value.

2. The method of claim 1, wherein validating the token value comprises:

generating, by the processor of the processing server, a comparison hash value by hashing the stored digital token with a one-way hashing algorithm; and comparing, by the processor of the processing server, the comparison hash value with the value token.

3. The method of claim 1, further comprising:

receiving, by the receiver of the processing server, a verification request from the second computing device, the verification request including at least a first hash value and presented device data;

generating, by the processor of the processing server, a second hash value by hashing the stored digital token with a one-way hashing algorithm;

validating, by the processor of the processing server, that the first hash value is equivalent to the second hash value and that the presented device data is equivalent to the stored first device data; and transmitting, by the transmitter of the processing server, a response message to the second computing device in response to the received verification request indicating ownership of the digital token by a device associated with the first device data.

4. The method of claim 3, wherein the verification request further includes the second device data, the response message is transmitted to the second computing device prior to receiving the transaction message.

5. The method of claim 1, further comprising:

receiving, by the receiver of the processing server, a surrender token request; and transmitting, by the transmitter of the processing server, the token value to the second computing device in response to the received surrender token request.

6. The method of claim 5, wherein the surrender token request is received from the second computing device.

7. The method of claim 5, further comprising:

storing, in the memory of the processing server, a hold status notification associated with the stored digital token after receipt of the received surrender token request.

8. The method of claim 7, further comprising:

removing, in the memory of the processing server, the hold status notification associated with the stored digital token after replacement of the stored first device data with the second device data.

9. A system for secure ownership transfer of a digital token, comprising:

a first computing device;

a second device;

a merchant system; and a processing server, the processing server including a receiver receiving a token request from the first computing device, via the merchant system, the token request including at least first device data associated with the first computing device, a processor generating a digital token, a memory storing the generated digital token and first device data, and a transmitter transmitting the generated digital token to the first computing device, via the merchant system, in response to the received token request, wherein the receiver of the processing server receives a transaction message for a payment transaction, the transaction message including second device data associated with a second device and at last one data element storing a token value, said token value being a hash value generated by hashing the digital token, the processor of the processing server validates the token value, and the memory of the processing server replaces the stored first device data with second device data after successful validation of the token value.

10. The system of claim 9, wherein validating the token value comprises:

generating, by the processor of the processing server, a comparison hash value by hashing the stored digital token with a one-way hashing algorithm; and comparing, by the processor of the processing server, the comparison hash value with the value token.

11. The system of claim 9, further wherein the receiver of the processing server receives, from the second computing device, a verification request including at least a first hash value and presented device data, the processor of the processing server generates a second hash value by hashing the stored digital token with a one-way hashing algorithm, and validates that the first hash value is equivalent to the second hash value and that the presented device data is equivalent to the stored first device data, and the transmitter of the processing server transmits a response message to the second computing device in response to the received verification request indicating ownership of the digital token by a device associated with the first device data.

12. The system of claim 11, wherein the verification request further includes the second device data, the response message is transmitted to the second computing device prior to receiving the transaction message.

13. The system of claim 9, wherein the receiver of the processing server receives a surrender token request, and the transmitter of the processing server transmits the token value to the second computing device in response to the received surrender token request.

14. The system of claim 13, wherein the surrender token request is received from the second computing device.

15. The system of claim 13, wherein the memory of the processing server stores a hold status notification associated with the stored digital token after receipt of the received surrender token request.

16. The system of claim 15, wherein the memory of the processing server removes the hold status notification associated with the stored digital token after replacement of the stored first device data with the second device data.

* * * * *